(12) United States Patent
Watanabe et al.

(10) Patent No.: US 11,163,033 B2
(45) Date of Patent: Nov. 2, 2021

(54) ULTRASONIC MEASUREMENT DEVICE AND MEASUREMENT METHOD

(71) Applicant: Seiko Epson Corporation, Tokyo (JP)

(72) Inventors: Ryoki Watanabe, Matsumoto (JP); Tomohide Onogi, Chino (JP)

(73) Assignee: Seiko Epson Corporation

( * ) Notice: Subject to any disclaimer, the term of this patent is extended or adjusted under 35 U.S.C. 154(b) by 501 days.

(21) Appl. No.: 16/229,086

(22) Filed: Dec. 21, 2018

(65) Prior Publication Data

US 2019/0195980 A1    Jun. 27, 2019

(30) Foreign Application Priority Data

Dec. 27, 2017   (JP) .............................. JP2017-250708

(51) Int. Cl.
*G01S 3/801* (2006.01)
*G01S 3/803* (2006.01)
*G01S 7/521* (2006.01)
*G01S 15/42* (2006.01)

(52) U.S. Cl.
CPC ............ *G01S 3/801* (2013.01); *G01S 3/8032* (2013.01); *G01S 7/521* (2013.01); *G01S 15/42* (2013.01)

(58) Field of Classification Search
CPC .......... G01S 3/801; G01S 7/521; G01S 15/42; G01S 3/8032; G01B 17/00; G01B 17/06
See application file for complete search history.

(56) References Cited

U.S. PATENT DOCUMENTS

| 2016/0209508 A1 | 7/2016 | Hayashi | |
| 2019/0195980 A1* | 6/2019 | Watanabe | ............... G01S 3/801 |

FOREIGN PATENT DOCUMENTS

| CN | 110017799 A | * | 7/2019 | ............. G01S 15/42 |
| JP | 2006-003278 A | | 1/2006 | |
| JP | 2019117097 A | * | 7/2019 | ............. G01S 7/521 |
| WO | WO-2015-033436 A1 | | 3/2015 | |

* cited by examiner

*Primary Examiner* — Daniel Pihulic
(74) *Attorney, Agent, or Firm* — Harness, Dickey & Pierce, P.L.C.

(57) ABSTRACT

An ultrasonic measurement device includes an ultrasonic transceiver transmitting an ultrasonic wave and receiving a reflected wave from a target so as to output a reception signal, a scanner moving a transmission/reception position where the ultrasonic transceiver transmits and receives the ultrasonic wave along a first direction, and a position measurer measuring a position of the target. When the position measurer detects a plurality of reception signals corresponding to a plurality of reflection components caused by a difference in distances from the target at a first transmission/reception position in the first direction, the position measurer selects the reception signal based on a ratio between a voltage of the reception signals at a comparison transmission/reception position different from the first transmission/reception position and a voltage of the reception signals at the first transmission/reception position, and measures the position of the target based on the selected reception signal.

7 Claims, 13 Drawing Sheets

ULTRASONIC MEASUREMENT DEVICE AND MEASUREMENT METHOD

BACKGROUND

1. Technical Field

The present invention relates to an ultrasonic measurement device and a measurement method.

2. Related Art

In the related art, an ultrasonic measurement device is known which transmits an ultrasonic wave, receives the ultrasonic wave reflected on an object, and detects a position of the object, based on a time required from a transmission timing of the ultrasonic wave to a reception timing. (for example, refer to JP-A-2006-3278).

However, according to the device disclosed in JP-A-2006-3278, it is difficult to accurately measure a shape or a surface state (unevenness) of the object (target). For example, in a case where an edge portion exists on a surface or an end portion of the target, the following state appears. In the state, a first surface whose distance from the ultrasonic measurement device is set to L1 and a second surface whose distance from the ultrasonic measurement device is set to L2 different from L1 (L1<L2 or L1>L2) are adjacent to each other. In a case of measuring a periphery of the edge portion, a reflected wave from the first surface and a reflected wave from the second surface are received while both the reflected waves are mixed with each other. According to the device disclosed in JP-A-2006-3278, when the reflected wave is received from the first surface and when the reflected wave is received from the second surface, reception signals are respectively output. However, determination cannot be made on which reception signal has to be used in order to calculate the position of the object. Consequently, it is difficult to identify whether a currently measuring region (region transmitting the ultrasonic wave) is the first surface or the second surface in the target.

SUMMARY

An advantage of some aspects of the invention is to provide an ultrasonic measurement device and a measurement method which are capable of accurately measuring a shape of a target.

An ultrasonic measurement device according to an application example of the invention includes an ultrasonic transceiver that transmits an ultrasonic wave and receives a reflected wave reflected on a target so as to output a reception signal, a scanning unit that moves a transmission/reception position where the ultrasonic transceiver transmits and receives the ultrasonic wave, along a first direction, and a position measurement unit that measures a position of the target. When a plurality of the reception signals corresponding to a plurality of reflection components caused by a difference in distances from the target are detected at a first transmission/reception position in the first direction, the position measurement unit selects the reception signal, based on a ratio between a voltage value of the plurality of reception signals at a comparison transmission/reception position different from the first transmission/reception position and a voltage value of the plurality of reception signals at the first transmission/reception position. The position measurement unit measures the position of the target, based on the selected reception signal.

In the application example, the transmission/reception position where the ultrasonic transceiver performs a transmission/reception process on the ultrasonic wave is scanned in the first direction by the scanning unit, and acquires a transmission/reception result of the ultrasonic wave at a plurality of transmission/reception positions. The position measurement unit measures the position of the target by calculating a distance to the target from the ultrasonic transceiver for each of the transmission/reception positions. In this manner, it is possible to measure a shape of the target extending along the first direction. Incidentally, in a case where a stepped portion such as unevenness is present in the first direction, when the transmission/reception position is moved to a position facing the stepped portion, the ultrasonic transceiver receives the reflected waves reflected on a plurality of points whose distances are different from each other. Accordingly, the ultrasonic transceiver outputs the plurality of reception signals corresponding to the reflected waves reflected on the plurality of points whose distances are different from each other. For example, the reception signal having a first reflection component reflected on a point located at the position whose distance is close is received at a first timing, and the reception signal having a second reflection component reflected on a point located at the position whose distance is far is received at a second timing after the first timing.

In the application example, in this case, the position of the target is measured by selecting the reception signal in which an amplification factor is maximized or an attenuation factor is minimized, based on the ratio (amplification factor or attenuation factor) between the voltage value of the plurality of reception signals at the first transmission/reception position and the voltage value of the plurality of reception signals at the comparison transmission/reception position. In this manner, a proper reception signal corresponding to the first transmission/reception position is selected. Accordingly, for example, compared to a case where the position of the target is measured from the reception signal received first time, the distance to the target can be accurately calculated, and the shape of the target can be measured with high resolution.

In the ultrasonic measurement device according to the application example, it is preferable that the position measurement unit measures the position of the target, based on the reception signal corresponding to a primary reflection component reflected from the target.

In the application example with this configuration, after the reception signal having the primary reflection component (primary reception signal), that is, the ultrasonic wave is transmitted, the position of the target is measured, based on the reception signal when the reflected wave reflected on the target first time is received. The primary reception signal has a voltage value which is greater than that of the reception signal having the multiple reflection component which is subsequent to the secondary reception signal. Therefore, it is possible to accurately calculate the ratio of the voltage values between the primary reception signal received at the first transmission/reception position and the primary reception signal received at the comparison transmission/reception position. In this manner, the reception signal can be properly selected, and accuracy and resolution can be improved in measuring the position of the target.

In the ultrasonic measurement device according to the application example, it is preferable that the comparison transmission/reception position includes a negative side comparison position closer to a negative side in the first direction than the first transmission/reception position and a positive side comparison position closer to a positive side in the first direction than the first transmission/reception position.

In a case where the stepped portion such as unevenness is present in the target along the first direction and the distance of the target from the position measurement unit is changed from a first distance to a second distance, if the transmission/reception position is scanned along the first direction, strength of a first reception signal corresponding to the first distance increases on the negative side in the first direction, and strength of a second reception signal corresponding to the second distance increases on the positive side in the first direction. In this case, when the first transmission/reception position is changed to a position facing the stepped portion, the first reception signal and the second reception signal have substantially the same voltage value. In this case, if the distance is calculated based on an incorrect reception signal, the accuracy in measuring the position becomes poor.

In the application example with this configuration, in this case, the reception signal is selected using the plurality of reception signals detected at the negative side comparison position and the positive side comparison position across the first transmission/reception position in the first direction. That is, the reception signal is selected by comparing a ratio of the plurality of reception signals at the first transmission/reception position with respect to the negative side comparison position with a ratio of the plurality of reception signals at the first transmission/reception position with respect to the positive side comparison position. In this manner, an optimal reception signal can be selected when the position of the target is measured at the first transmission/reception position. Therefore, the accuracy and the resolution can be improved in measuring the position of the target.

It is preferable that the ultrasonic measurement device according to the application example further includes a multiple reflection detection unit that detects the reception signal corresponding to the ultrasonic wave reflected multiple times between the target and the ultrasonic transceiver at the first transmission/reception position, in which the position measurement unit measures the position of the target, based on the reception signal corresponding to the ultrasonic wave reflected multiple times which is detected by the multiple reflection detection unit.

In the ultrasonic measurement with this configuration, if the ultrasonic wave is transmitted from the ultrasonic transceiver, the ultrasonic wave widely propagates in multiple directions. Therefore, when the ultrasonic wave is received by the ultrasonic transceiver, the ultrasonic wave reflected on an object other than the target is also received, thereby increasing noise components. On the other hand, if the ultrasonic wave is transmitted to the target from the ultrasonic transceiver, the ultrasonic wave is repeatedly reflected multiple times between the target and the ultrasonic transceiver. Accordingly, the reception signal corresponding to the multiple reflection component is also output from the ultrasonic transceiver. In a case where the reception signal having the plurality of reflection components is included in the ultrasonic wave due to the stepped portion, the multiple reflection component is also included in the ultrasonic wave as much as a combination thereof.

In the application example with this configuration, the multiple reflection detection unit detects the reception signal corresponding to the multiple reflection component of the ultrasonic wave. In this manner, it is possible to preferably detect whether the reception signal has the reflection component reflected on the target or the noise component reflected on the object other than the target. Therefore, the position measurement unit measures the position of the target, based on the reception signal corresponding to the reflection component from which the multiple reflection component is detected. In this manner, it is possible to perform highly accurate measurement excluding the noise component.

In the ultrasonic measurement device according to the application example, it is preferable that the scanning unit moves the transmission/reception position after receiving the reception signal corresponding to a primary reflection component and the reception signal corresponding to a secondary reflection component.

In the application example with this configuration, the scanning unit moves the transmission/reception position after receiving the reception signal corresponding to the secondary reflection component. Accordingly, the multiple reflection detection unit can accurately detect the multiple reflection component.

In the ultrasonic measurement device according to the application example, it is preferable that the scanning unit further moves the transmission/reception position along a second direction intersecting the first direction, and that the position measurement unit selects the reception signal, based on a ratio of voltage values of the plurality of reception signals between a first comparison transmission/reception position different from the first transmission/reception position in the first direction and the first transmission/reception position, and a ratio of voltage values of the plurality of reception signals between a second comparison transmission/reception position different from the first transmission/reception position in the second direction and the first transmission/reception position.

In the application example with this configuration, the scanning unit moves the transmission/reception position used by the ultrasonic transceiver in the first direction and the second direction. The position measurement unit selects the reception signal, based on a ratio of the plurality of reception signals at the first transmission/reception position with respect to the first comparison transmission/reception position and a ratio of the plurality of reception signals at the first transmission/reception position with respect to the second comparison transmission/reception position.

In this manner, even in a case where the stepped portion such as unevenness is present along not only the first direction but also the second direction, the position of the target can be accurately measured.

A measurement method according to an application example of the invention is a measurement method of a position of a target in an ultrasonic measurement device having an ultrasonic transceiver that transmits an ultrasonic wave and receives a reflected wave reflected on the target so as to output a reception signal. The measurement method includes moving a transmission/reception position where the ultrasonic transceiver transmits and receives the ultrasonic wave, along a first direction, and measuring the position of the target, based on the reception signal received at the transmission/reception position. In measuring the position of the target, when a plurality of the reception signals corresponding to a plurality of reflection components caused by a difference in distances from the target are detected at a first transmission/reception position in the first direction, the position measurement unit selects the reception signal, based on a ratio between a voltage value of the plurality of reception signals at a comparison transmission/reception position different from the first transmission/reception position and a voltage value of the plurality of reception signals at the first transmission/reception position. The position measurement unit measures the position of the target, based on the selected reception signal.

In the application example, similar to the above-described application example, the position of the target is measured by selecting the optimal reception signal, based on the ratio (amplification factor or attenuation factor) between the voltage value of the reception signal having the plurality of reflection components at the first transmission/reception position and the voltage value of the reception signal having the plurality of reflection components at the comparison transmission/reception position corresponding thereto. In this manner, the distance to the target facing the first transmission/reception position is accurately calculated. Therefore, the shape of the target can be measured with high resolution.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, an ultrasonic measurement device according to a first embodiment of the invention will be described.

Figure 1:
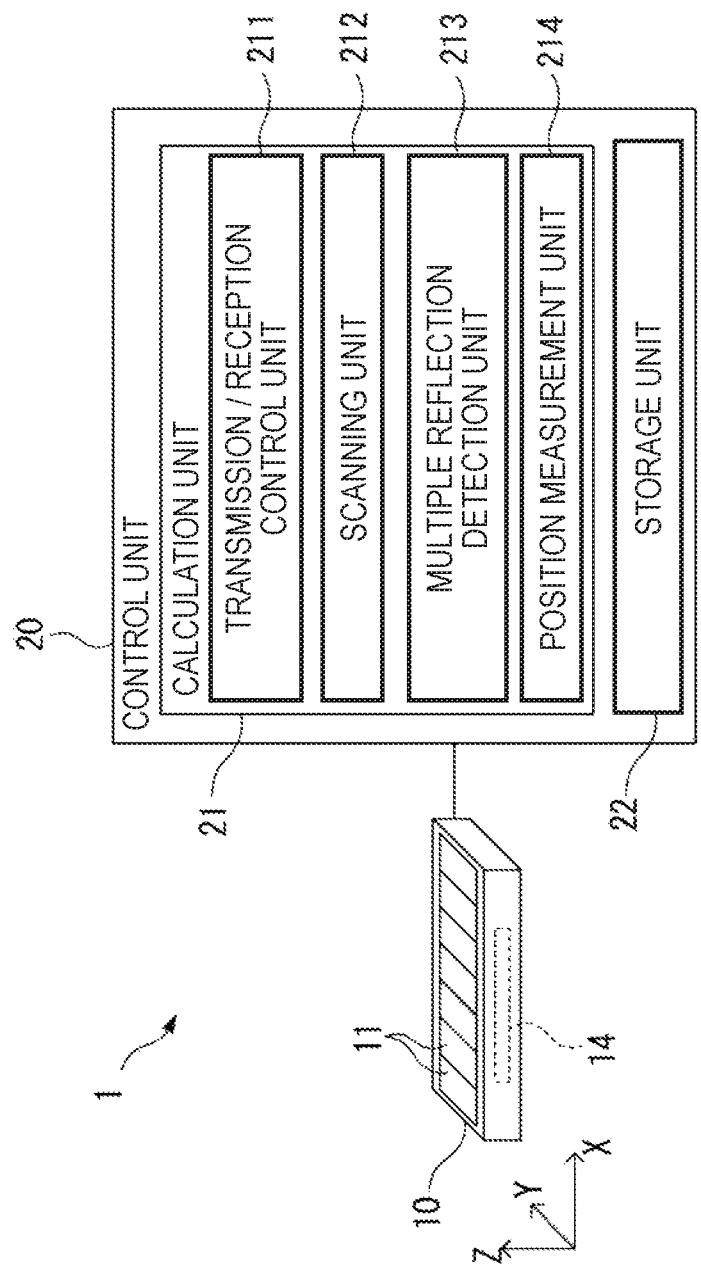
FIG. 1 is a view illustrating a schematic configuration of an ultrasonic measurement device according to a first embodiment.

FIG. 1 is a view illustrating a schematic configuration of an ultrasonic measurement device 1 according to the present embodiment.

The ultrasonic measurement device 1 includes an ultrasonic sensor 10 that transmits and receives an ultrasonic wave and a control unit 20 that controls the ultrasonic sensor 10. In the ultrasonic measurement device 1, the control unit 20 controls the ultrasonic sensor 10 so that the ultrasonic sensor 10 transmits the ultrasonic wave to a target and receives the ultrasonic wave (reflected wave) reflected on the target. Based on a time required from a transmission timing of the ultrasonic wave until a reception timing of the ultrasonic wave and sound speed in a medium (for example, air) from the ultrasonic sensor 10 to the target, the control unit 20 calculates a distance from the ultrasonic sensor 10 to the target, and measures a shape of the target.

Configuration of Ultrasonic Sensor 10

Figure 2:
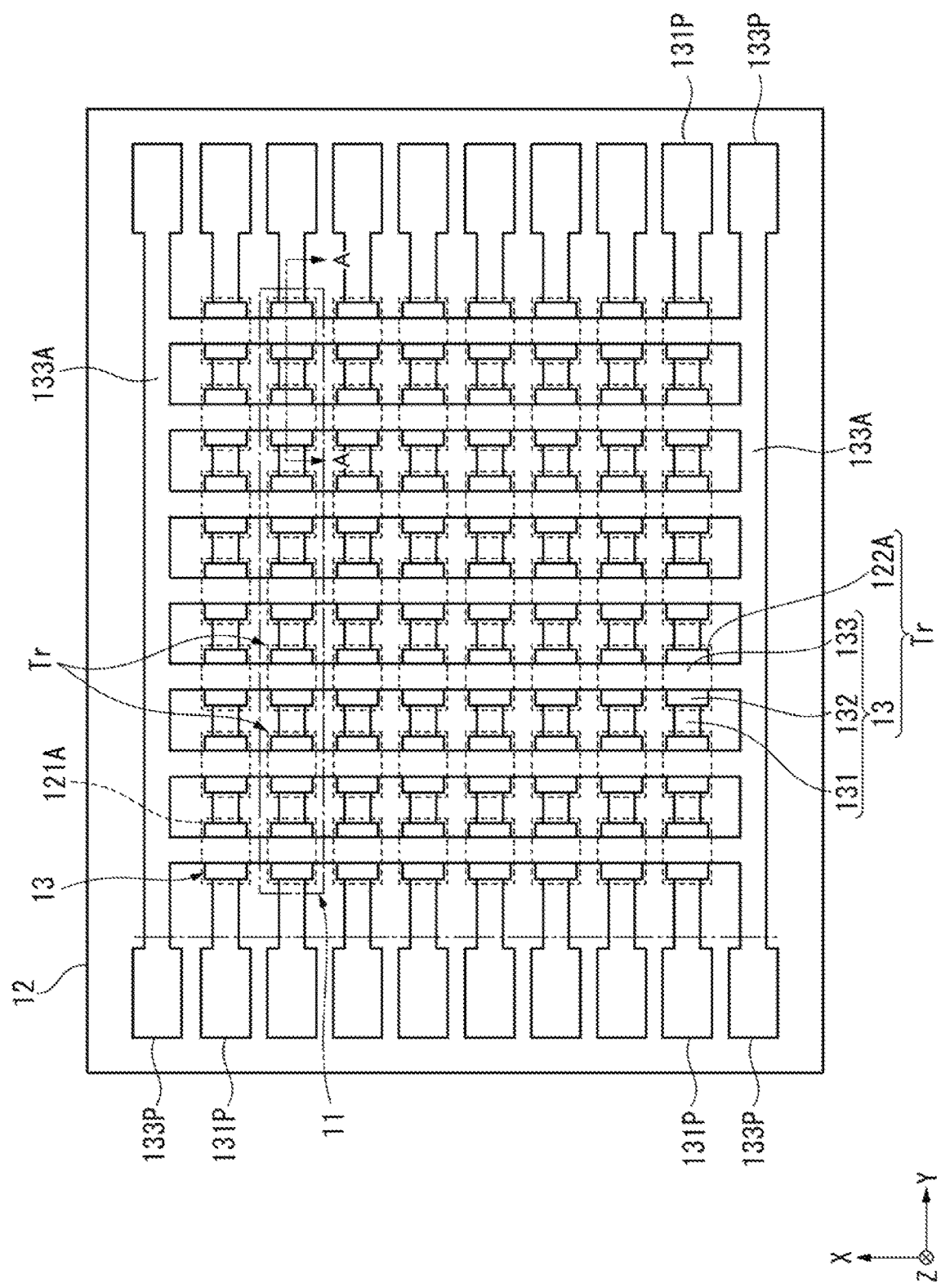
FIG. 2 is a plan view illustrating a schematic configuration of a main portion of an ultrasonic sensor according to the first embodiment.
Figure 3:
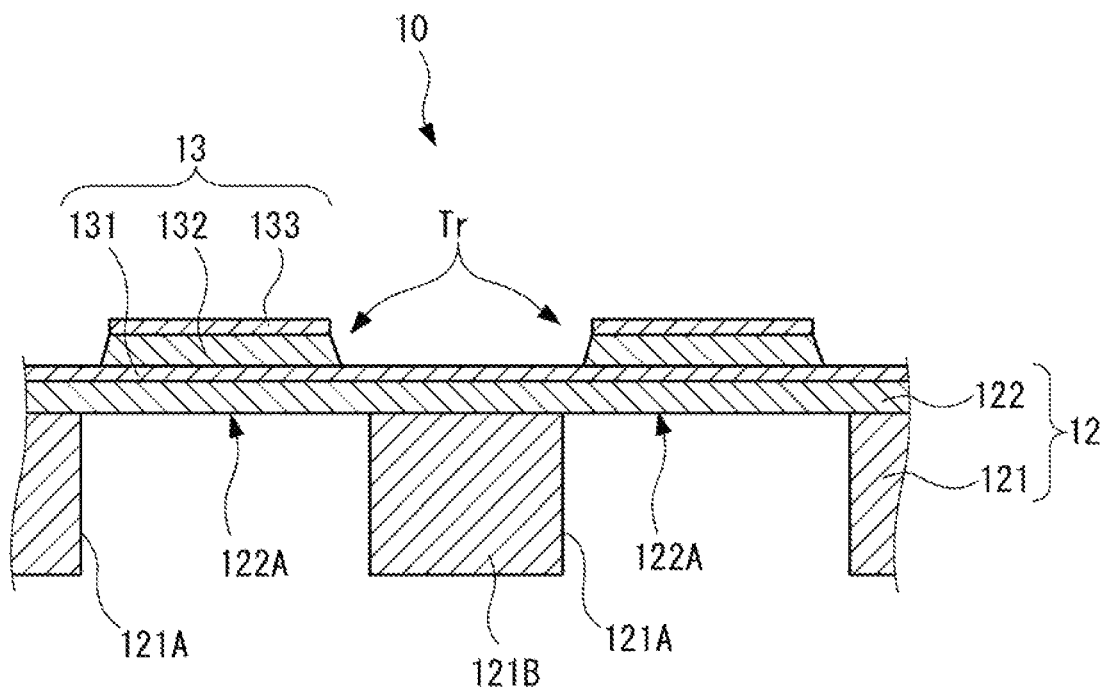
FIG. 3 is a sectional view taken along line A-A in FIG. 2.

FIG. 2 is a plan view illustrating a schematic configuration of a main portion of the ultrasonic sensor 10 according to the present embodiment. FIG. 3 is a sectional view of the ultrasonic sensor 10 which is taken along line A-A in FIG. 2.

As illustrated in FIGS. 1 and 2, the ultrasonic sensor 10 includes a plurality of ultrasonic transceivers 11 arranged along an X-direction (first direction). In the present embodiment, each of the ultrasonic transceivers 11 is configured to include a plurality of ultrasonic transducers Tr aligned in a Y-direction (second direction) intersecting (in the present embodiment, orthogonal to) the X-direction. An example will be described in which the ultrasonic transceiver 11 is configured to include the plurality of ultrasonic transducers Tr arrayed in parallel in the Y-direction. Alternatively, for example, one ultrasonic transceiver 11 may be configured to include one ultrasonic transducer Tr. In addition, one ultrasonic transceiver 11 may be configured to include the plurality of ultrasonic transducers Tr arrayed in parallel in an arrayed shape in the X-direction and the Y-direction.

More specifically, as illustrated in FIG. 3, the ultrasonic sensor 10 is configured to include an element board 12 and a piezoelectric element 13. In the following description, a board thickness direction of the element board 12 will be referred to as a Z-direction (transmitting direction of the ultrasonic wave is a +Z-side), and the X-direction and the Y-direction are two axial directions orthogonal to the Z-direction.

As illustrated in FIG. 3, the element board 12 includes a board main body portion 121 and a vibration membrane 122 disposed on one surface side (for example, a −Z-side) of the board main body portion 121.

The board main body portion 121 is a board for supporting the vibration membrane 122, and is configured to include a semiconductor board made of Si, for example. In a plan view in the Z-direction, as illustrated in FIGS. 2 and 3, the board main body portion 121 has an opening portion 121A disposed at a position which overlaps the ultrasonic transducer Tr.

For example, the vibration membrane 122 is configured to include a stacked body made of $SiO_2$ or $SiO_2$ and $ZrO_2$, and is disposed on the −Z-side of the board main body portion 121. The vibration membrane 122 is supported by a wall portion 121B (refer to FIG. 3) of the board main body portion 121 configuring the opening portion 121A, and closes the −Z-side of the opening portion 121A. In the vibration membrane 122, a portion (region which closes the opening portion 121A) which overlaps the opening portion 121A in a plan view configures a vibration portion 122A. That is, the opening portion 121A defines an outer edge of the vibration portion 122A of the vibration membrane 122.

The piezoelectric element 13 is disposed at a position overlapping each vibration portion 122A (each opening portion 121A) in a plan view in the Z-direction, on one surface (for example, a surface on the −Z-side) of the vibration membrane 122. As illustrated in FIG. 3, the piezoelectric element 13 is configured so that a lower electrode 131, a piezoelectric film 132, and an upper electrode 133 are sequentially stacked on the vibration membrane 122.

As illustrated in FIG. 1, the lower electrode 131 is linearly formed along the Y-direction. For example, both end portions (end portions on a ±Y-side) of the lower electrode 131 serve as a lower electrode terminal 131P connected to the circuit board which controls the ultrasonic sensor 10.

The upper electrode 133 is linearly formed along the X-direction. An end portion on the ±X-side of the upper electrode 133 is connected to a common electrode line 133A. The common electrode line 133A connects the plurality of upper electrodes 133 arranged to each other in the Y-direction. Both end portions (end portion on the ±Y-side) of the common electrode line 133A serve as an upper electrode terminal 133P connected to the circuit board.

For example, the piezoelectric film 132 is formed of a piezoelectric thin film made of lead zirconate titanate (PZT).

Here, one ultrasonic transducer Tr is configured to include one vibration portion 122A in the vibration membrane 122 and the piezoelectric element 13 disposed on the vibration portion 122A. Therefore, as illustrated in FIG. 2, the ultrasonic sensor 10 has the plurality of ultrasonic transducers Tr arranged along the X-direction and the Y-direction.

In the ultrasonic sensor 10 according to the present embodiment, the lower electrode 131 is common to the plurality of ultrasonic transducers Tr arranged in the Y-direction. Accordingly, as described above, one ultrasonic transceiver 11 is configured to include the plurality of ultrasonic transducers Tr arranged in the Y-direction.

As illustrated in FIG. 1, the ultrasonic sensor 10 has a driver circuit (control circuit 14) for controlling the driving of the ultrasonic sensor 10.

Figure 4:
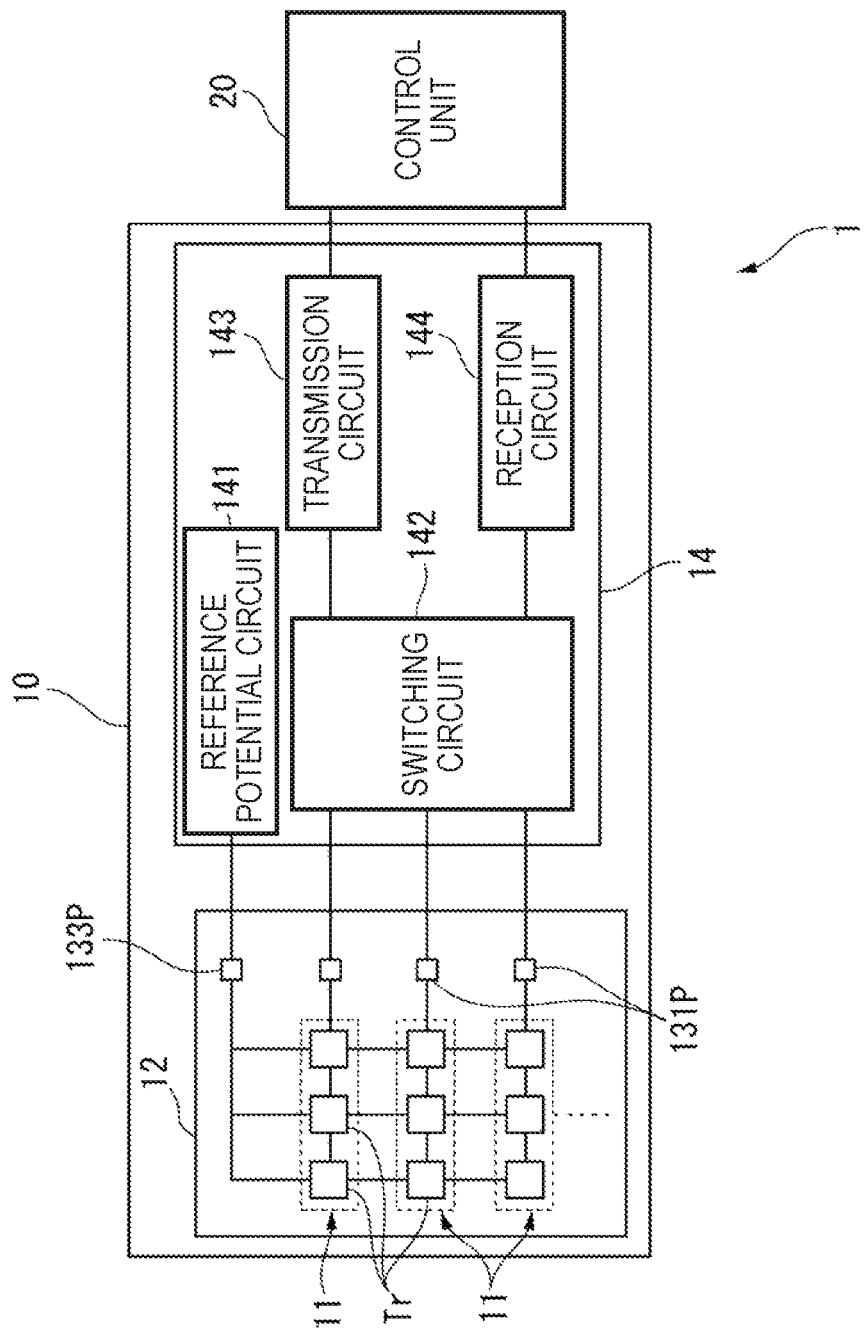
FIG. 4 is a view schematically illustrating a circuit configuration of a control circuit of the ultrasonic sensor according to the first embodiment.

FIG. 4 is a view schematically illustrating a circuit configuration of the control circuit 14. As illustrated in FIG. 4, the control circuit 14 includes a reference potential circuit 141, a switching circuit 142, a transmission circuit 143, and a reception circuit 144.

The reference potential circuit 141 is connected to the upper electrode terminal 133P, and applies a reference potential (for example, −3V) to the upper electrode terminal 133P.

The switching circuit 142 is connected to each of the lower electrode terminals 131P, the transmission circuit 143, and the reception circuit 144. The switching circuit 142 is configured to include a switching circuit, and switches between transmission connection for connecting each of the lower electrode terminals 131P and the transmission circuit 143 and reception connection for connecting each of the lower electrode terminals 131P and the reception circuit 144. Under the control of the control unit 20, the switching circuit 142 controls the lower electrode terminal 131P connected to the transmission circuit 143 and the reception circuit 144, and switches the ultrasonic transceivers 11 for performing the transmission/reception process on the ultrasonic wave.

The transmission circuit 143 is connected to the switching circuit 142 and the control unit 20. When the switching circuit 142 is switched to the transmission connection, a drive signal having a pulse waveform is output to each of the ultrasonic transducers Tr under the control of the control unit 20, and the ultrasonic wave is transmitted from the ultrasonic sensor 10.

The reception circuit 144 is connected to the switching circuit 142 and the control unit 20. When the switching circuit 142 is switched to the reception connection, the reception signal is input from each of the lower electrodes 131. For example, the reception circuit 144 is configured to include a linear noise amplifier and an A/D converter. Predetermined signal processing is performed on the reception signal input from the ultrasonic transceiver 11, and the processed signal is output to the control unit 20.

In the ultrasonic sensor 10 configured in this way, the lower electrode terminal 131P of the ultrasonic transceiver 11 and the transmission circuit 143 of the ultrasonic transceiver 11 are connected to each other by the switching circuit 142. In this manner, a pulse wave voltage having a predetermined frequency is applied between the lower electrode 131 and the upper electrode 133. In this manner, the piezoelectric film 132 expands and contracts in the ultrasonic transceiver 11. The vibration portion 122A of the vibration membrane 122 having the piezoelectric element 13 is vibrated at a frequency corresponding to an opening width of the opening portion 121A. The ultrasonic wave is transmitted from the +Z-side (opening portion 121A side) of the vibration portion 122A.

If the ultrasonic wave is input to the opening portion 121A, the vibration portion 122A is vibrated by the ultrasonic wave, and a potential difference is generated above and below the piezoelectric film 132. Therefore, if the lower electrode terminal 131P and the reception circuit 144 of the predetermined ultrasonic transceiver 11 are connected to each other by the switching circuit 142, the reception circuit 144 detects a voltage signal (reception signal) corresponding to the potential difference. Therefore, the ultrasonic wave can be detected (received).

Configuration of Control Unit

The control unit 20 is connected to the ultrasonic sensor 10, controls an operation of the ultrasonic sensor 10, and detects the position of the target, based on a transmission/reception result of the ultrasonic wave transmitted and received by the ultrasonic sensor 10.

As illustrated in FIG. 1, for example, the control unit 20 has a calculation unit 21 such as a central processing unit (CPU), and a storage unit 22 configured to include a memory. The calculation unit 21 reads and executes a program stored in the storage unit 22. In this manner, as illustrated in FIG. 1, the calculation unit 21 functions as the transmission/reception control unit 211, the scanning unit 212, the multiple reflection detection unit 213, and the position measurement unit 214.

The transmission/reception control unit 211 applies a periodic drive voltage to the ultrasonic transducer Tr of the predetermined ultrasonic transceiver 11, and transmits the ultrasonic wave so as to perform the transmission/reception process of the ultrasonic wave in which the ultrasonic wave (reflected wave) reflected on the target is received by the ultrasonic transceiver 11.

The scanning unit 212 switches the ultrasonic transceiver 11 which performs the transmission/reception process. Specifically, the ultrasonic transceivers 11 which perform the transmission/reception process of the ultrasonic wave are sequentially moved along the X-direction. That is, the transmission/reception positions for performing the transmission/reception process of the ultrasonic wave are sequentially moved in the X-direction.

The multiple reflection detection unit 213 detects the primary reception signal corresponding to the reflection component (primary reflection component) of the ultrasonic wave reflected on the target first time and the reception signal corresponding to the multiple reflection component of the ultrasonic wave reflected on the target multiple times, from the reception signal obtained during the transmission/reception process of the ultrasonic wave which is performed by the ultrasonic transceiver 11. In addition, the multiple reflection detection unit 213 detects a peak position (reception timing (reception time) at which the voltage value reaches the peak) of each reception signal.

The position measurement unit 214 measures the position of the target, based on the result of the transmission/reception process of the ultrasonic wave which is performed by the ultrasonic transceiver 11. Specifically, the position measurement unit 214 calculates the distance from the ultrasonic sensor 10 to the target. In the present embodiment, the distance from the ultrasonic sensor 10 to the target is calculated for each transmission/reception position along the X-direction. Therefore, based on the distance, a surface shape of the target along the X-direction can be measured.

Measurement Method Using Ultrasonic Measurement Device

Next, a measurement method of measuring the position of the target by using the above-described ultrasonic measurement device 1 will be described.

Figure 5:
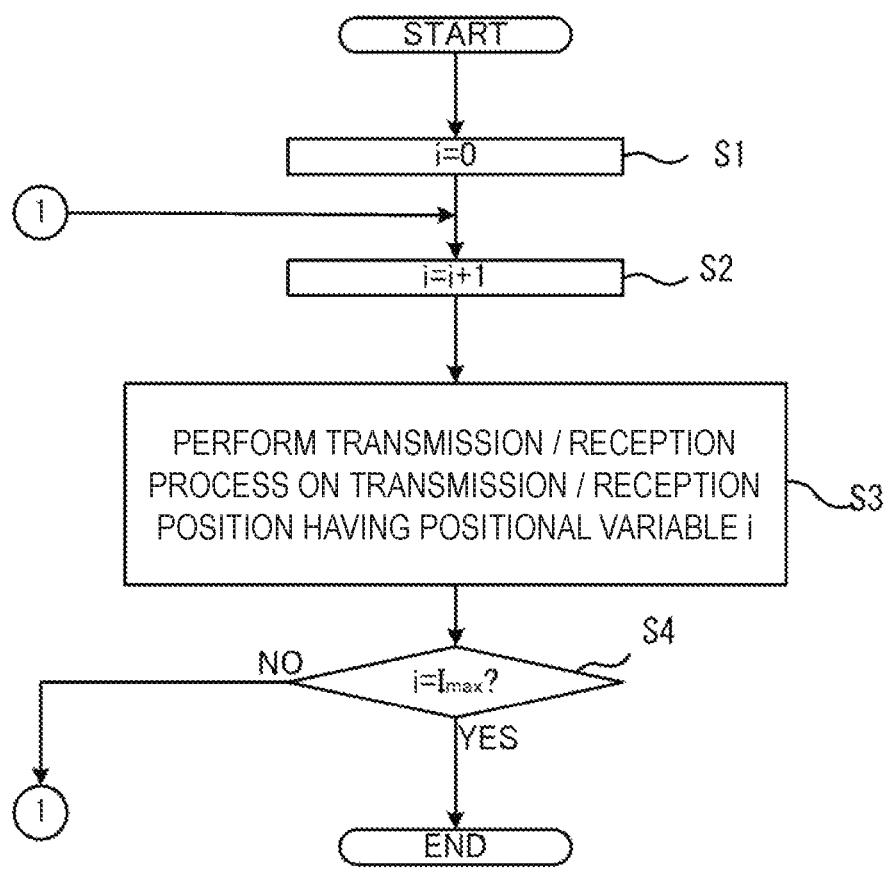
FIG. 5 is a flowchart illustrating a transmission/reception process of an ultrasonic wave in a measurement method of a position of a target, which is performed by the ultrasonic measurement device according to the first embodiment.

FIG. 5 is a flowchart illustrating the transmission/reception process (scanning) of the ultrasonic wave in the measurement method of measuring the position of the target by using the ultrasonic measurement device 1 according to the present embodiment.

In the ultrasonic measurement device 1 according to the present embodiment, for example, if a command signal to detect the position of the target is input by a user's operation, the transmission/reception control unit 211 of the control unit 20 and the scanning unit 212 start to perform scanning. More specifically, the scanning unit 212 initializes a positional variable i (i=0) (Step S1). The positional variable i is a variable indicating the position (transmission/reception position) for performing the transmission/reception process of the ultrasonic wave in the X-direction, and corresponds to the position of the ultrasonic transceiver 11. For example, i=1 indicates the ultrasonic transceiver 11 positioned in the end portion on the −X-side in the X-direction in the ultrasonic sensor 10. A maximum value $I_{max}$ of the positional variable i is the number of the ultrasonic transceivers 11 arranged along the X-direction in the ultrasonic sensor 10.

Next, the scanning unit 212 adds 1 to the positional variable i (Step S2), and causes the ultrasonic transceiver 11 corresponding to the positional variable i to perform the transmission/reception process (Step S3).

Figure 6:
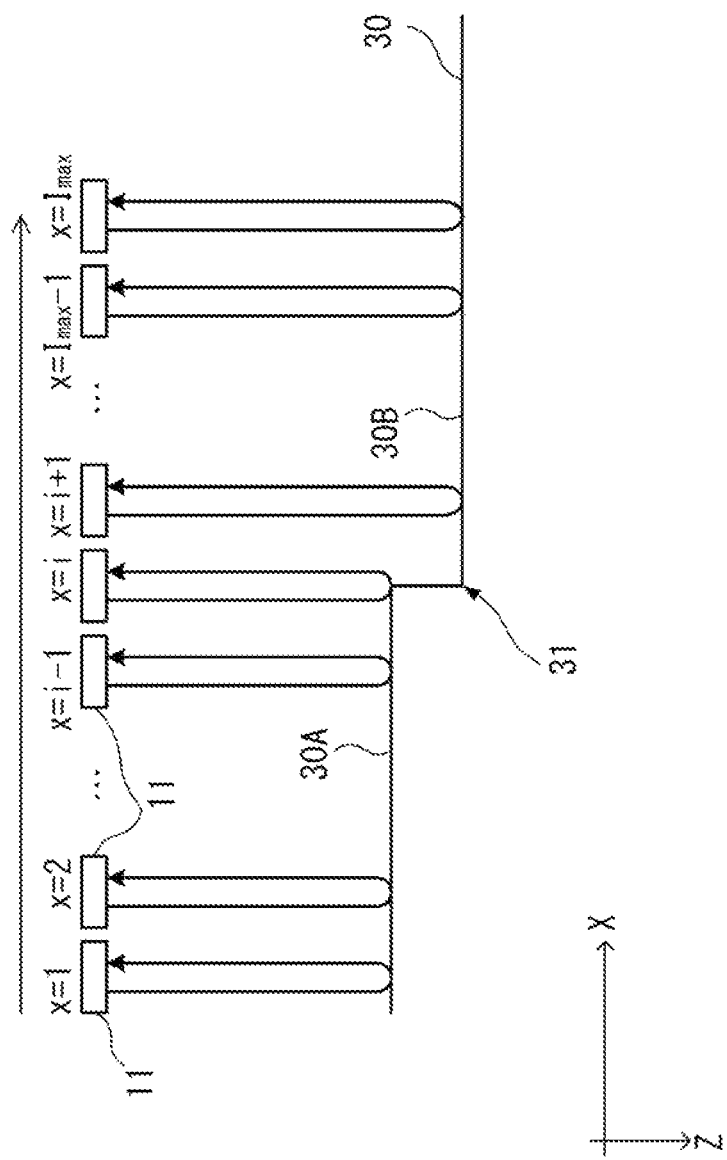
FIG. 6 is a schematic view illustrating the transmission/reception process of the ultrasonic wave according to the first embodiment.

FIG. 6 is a schematic view illustrating the transmission/reception process of the ultrasonic wave according to the present embodiment.

In Step S3, the scanning unit 212 first moves the transmission/receiving position for performing the transmission/reception process of the ultrasonic wave to a position of the positional variable i. That is, the scanning unit 212 switches a switching position of the switching circuit 142 to a position which allows the signal to be input and output from the ultrasonic transceiver 11 corresponding to the positional variable i.

The transmission/reception control unit 211 switches the switching circuit 142 to the transmission connection, and outputs the drive signal from the transmission circuit 143 to the ultrasonic transceiver 11 corresponding to the positional variable i. Thereafter, the transmission/reception control unit 211 switches the switching circuit 142 to the reception connection. In this manner, as illustrated in FIG. 6, the ultrasonic wave is transmitted from the ultrasonic transceiver 11, the reflected wave reflected on the target 30 is received by the ultrasonic transceiver 11, and the reception signal is input from the reception circuit 144 to the control unit 20. In Step S3, the transmission/reception control unit 211 continuously receives the ultrasonic wave at least until the reception signal having the secondary reflection component is acquired. In a case where the distance from the ultrasonic sensor 10 to the target 30 is approximately identified, an approximate time to receive the secondary reflected wave may be calculated in accordance with the distance, and the reception process may be continuously performed during the calculated time or longer.

The transmission/reception control unit 211 counts a time elapsed from the transmission timing of the ultrasonic wave, and associates the time (reception time) elapsed from when the reception signal is received and signal strength (voltage value) of the reception signal, with the positional variable i. The transmission/reception control unit 211 stores the associated information in the storage unit 22.

Thereafter, the scanning unit 212 determines whether or not the positional variable i reaches the maximum value $I_{max}$ (Step S4). If it is determined as No in Step S4, the process returns to Step S2. In this manner, as illustrated in FIG. 6, the transmission/reception process of the ultrasonic wave is sequentially performed at each transmission/reception position from x=1 to $x=I_{max}$ arrayed in parallel in the X-direction.

After the above-described processes are performed, the control unit 20 calculates the distance from the ultrasonic sensor 10 to the target in each positional variable i, and starts to perform a position measurement process for measuring the position of the target (surface position).

Figure 7:
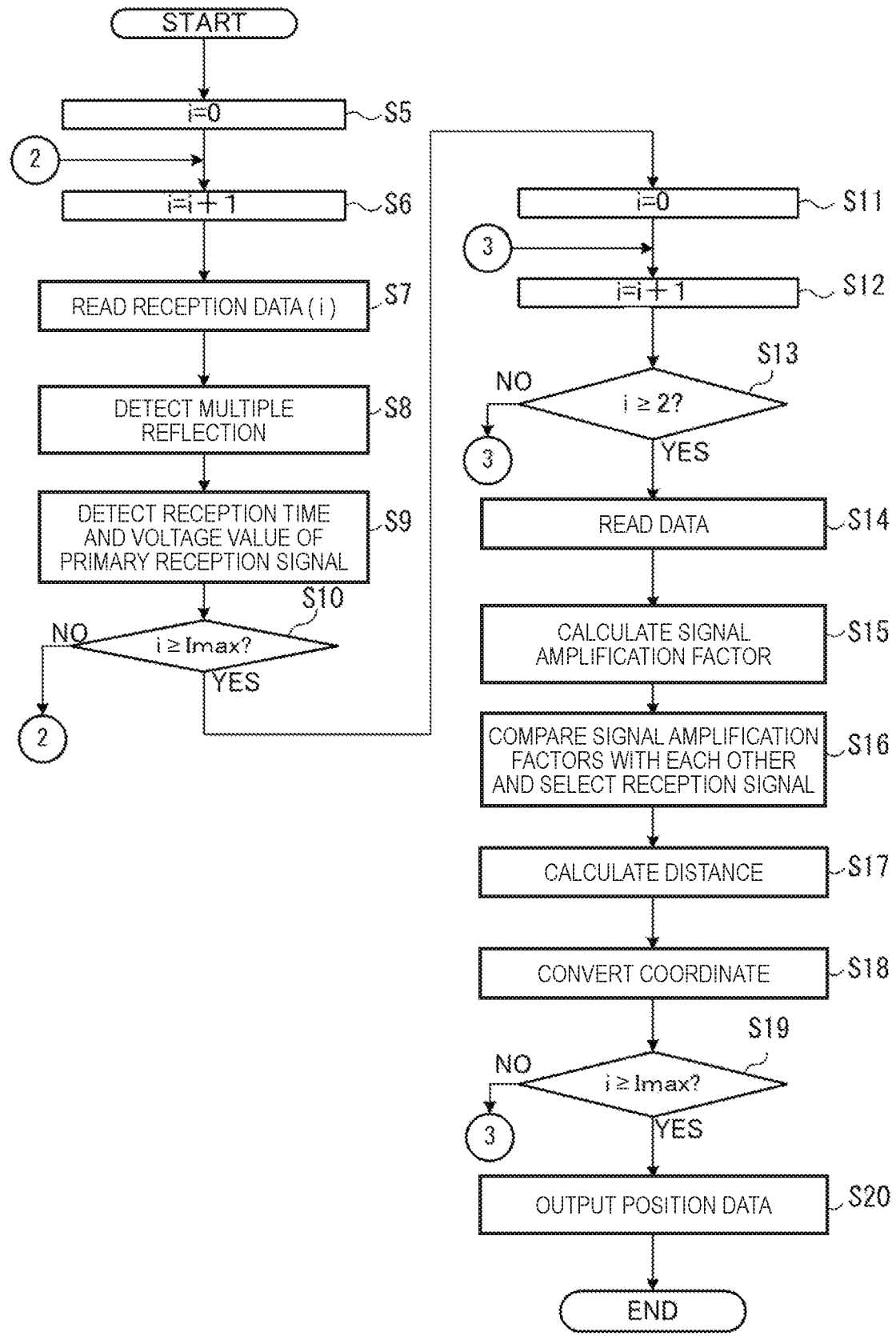
FIG. 7 is a flowchart illustrating a position measurement process in the measurement method of the position of the target, which is performed by the ultrasonic measurement device according to the first embodiment.

FIG. 7 is a flowchart illustrating the position measurement process in the measurement method of measuring the position of the target which is performed by the ultrasonic measurement device 1 according to the present embodiment.

In the position measurement process, the multiple reflection detection unit 213 first performs a step of detecting multiple reflection. Specifically, the multiple reflection detection unit 213 first initializes the positional variable i (i=0) (Step S5). Next, the position measurement unit 214 adds 1 to the positional variable i (Step S6), and reads data (reception data) of the transmission/reception process corresponding to the positional variable i, that is, each reception signal and the reception time obtained by the transmission/reception process and the voltage value of the reception signal (Step S7).

Next, the multiple reflection detection unit 213 extracts the reception signal corresponding to the multiple reflection component included in the reception data for the positional variable i (Step S8), and further, detects the peak position (reception time) and the voltage value of the primary reception signal, from each reception signal (Step S9).

The processes in Step S8 and Step S9 will be described in more detail.

Figure 8:
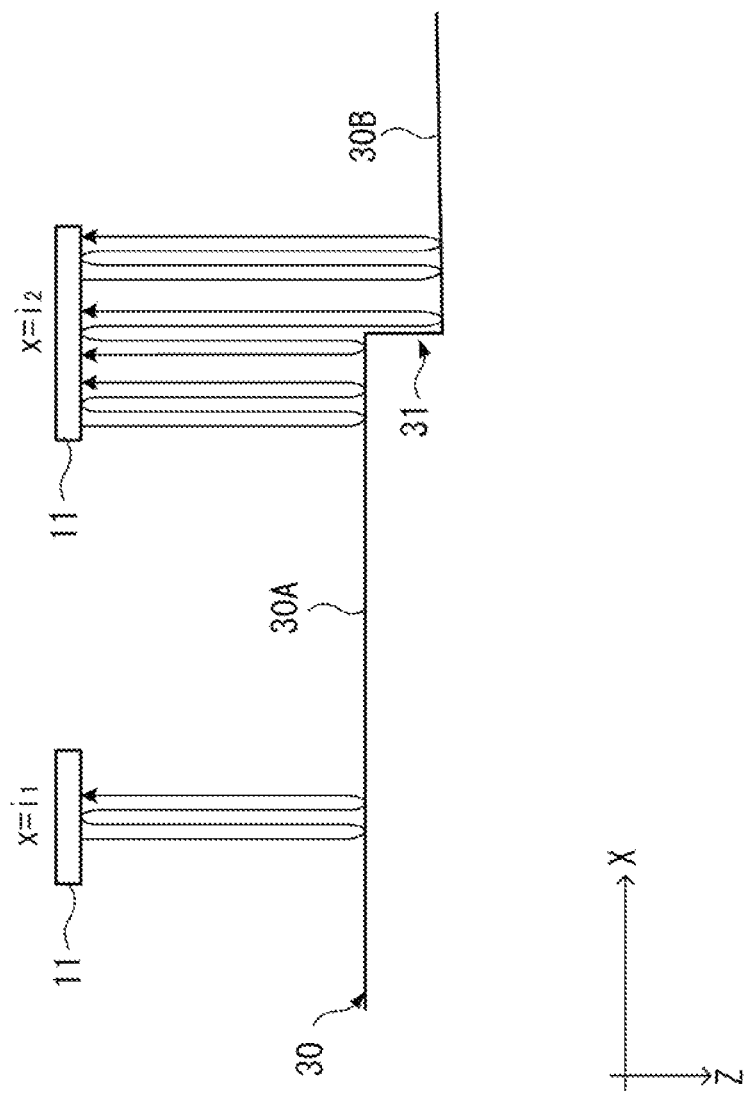
FIG. 8 is a view illustrating a path of the ultrasonic wave having a primary reflection component and a secondary reflection component when the ultrasonic wave is output to the target.
Figure 9:
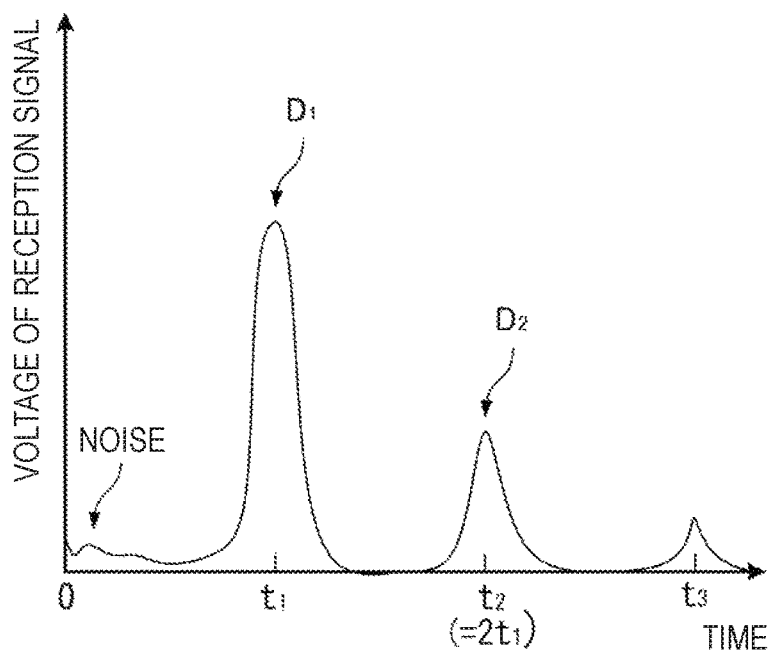
FIG. 9 is a view illustrating an example of a waveform of a reception signal received at a position $i_1$ in FIG. 8.
Figure 10:
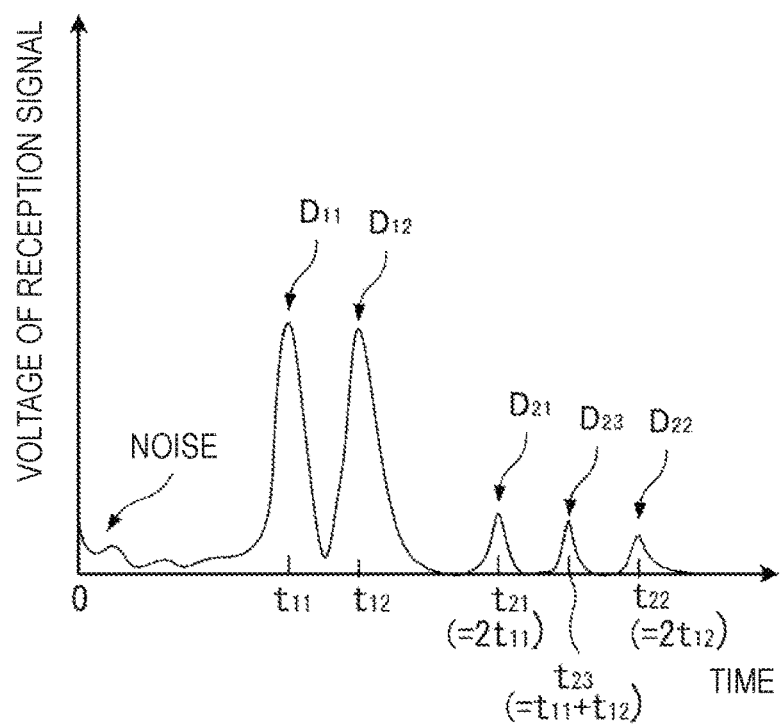
FIG. 10 is a view illustrating an example of the waveform of a reception signal received at a position $i_2$ in FIG. 8.

FIG. 8 is a view illustrating a path of the ultrasonic wave having the primary reflection component and the secondary reflection component when the ultrasonic wave is output to the target. FIG. 9 is a view illustrating an example of a waveform of the reception signal received at a position $i_1$ in FIG. 8. FIG. 10 is a view illustrating an example of a waveform of the reception signal received at a position $i_2$ in FIG. 8.

The position $i_1$ in FIG. 8 shows an example in which the distance from the ultrasonic sensor 10 to the surface (first surface 30A) of the target is uniform without having the stepped portion of the target facing the ultrasonic transceiver 11. In this case, if the ultrasonic wave is transmitted from the ultrasonic transceiver 11, the ultrasonic wave is reflected on the first surface 30A. Thereafter, when the ultrasonic transceiver 11 receives the ultrasonic wave, the reception signal (primary reception signal $D_1$ in FIG. 9) having the primary reflection component is obtained. The reflected wave reflected on the target 30 is reflected again on the ultrasonic transceiver 11. Thereafter, when the reflected wave is reflected on the target and received again by the ultrasonic transceiver 11, the reception signal (secondary reception signal $D_2$ in FIG. 9) having the secondary reflection component is obtained. FIG. 8 illustrates the secondary reflection component. However, the ultrasonic wave is subsequently reflected multiple times between the ultrasonic transceiver 11 and the target until the ultrasonic wave is attenuated. Accordingly, the plurality of reception signals are received at a constant period. In particular, in a case of detecting the target located within a distance close from the ultrasonic sensor 10, the ultrasonic wave is reflected multiple times until the ultrasonic wave is attenuated. Consequently, the plurality of reception signals are detected.

Here, the ultrasonic wave having the n-th reflection component moves forward as much as a distance n times the ultrasonic wave having the primary reflection component. Accordingly, the reception timing of the reception signal obtained by multiple reflection is an integer multiple (n times) of the reception timing of the reception signal $D_1$ having the primary reflection component. For example, a reception time t2 (time elapsed from the transmission timing to the reception timing) of the secondary reception signal is twice a reception time $t_1$ of the primary reception signal. Therefore, out of the reception signals obtained during the transmission/reception process of the ultrasonic wave, the reception signal whose reception time is integer multiple is detected. In this manner, it is possible to detect the reception signal corresponding to the multiple reflected component (including the primary reflection component), that is, the reception signal based on the reflected wave reflected on the target 30. Out of the reception signals having the multiple reflection component, the reception signal obtained first time is the primary reception signal. Accordingly, it is possible to easily detect the peak position (reception time) of the primary reception signal and the signal strength (voltage value).

On the other hand, in a case of the position $i_2$ in FIG. 8, a stepped portion 31 formed by an edge portion is present in the target 30 at a position facing the ultrasonic transceiver 11. The ultrasonic wave transmitted from the ultrasonic transceiver 11 is less oriented. Accordingly, the transmitted ultrasonic wave spreads in a wide range, and is reflected on the first surface 30A and the second surface 30B at a position different from that of the first surface 30A. Therefore, the primary reception signal corresponding to the primary reflection component includes a plurality of signals resulting from a difference in distances from the target 30. Accordingly, as the primary reception signal, the first primary reception signal (first reception signal) corresponding to the first surface 30A and the second primary reception signal (second reception signal) corresponding to the second surface 30B are obtained.

In a case where there are a plurality of surfaces having different positions in the Z-direction, the multiple reflection component includes the multiple reflection components as much as a combination of the surfaces having the different positions in the Z-direction.

For example, in a case where the first surface 30A and the second surface 30B are present as illustrated in FIG. 8, the secondary reception signals respectively corresponding to four secondary reflection components have the following secondary reflection components.

(I) the secondary reflection component which is secondarily reflected on the first surface 30A after being primarily reflected on the first surface 30A (II) the secondary reflection component which is secondarily reflected on the second surface 30B after being primarily reflected on the second surface 30B (III) the secondary reflection component which is secondarily reflected on the second surface 30B after being primarily reflected on the first surface 30A (IV) the secondary reflection component which is secondarily reflected on the first surface 30A after being primarily reflected on the second surface 30B Accordingly, as illustrated in FIG. 10, the following secondary reception signals are included.

The secondary reception signals include a secondary reception signal $D_{21}$ received at a reception time ($t_{21}$) which is twice a reception time ($t_{11}$) of a first primary reception signal $D_{11}$, a secondary reception signal $D_{22}$ received at a reception time ($t_{22}$) which is twice a reception time ($t_{12}$) of a second primary reception signal $D_{12}$, and a secondary reception signal $D_{23}$ received at a reception time ($t_{23}$) which is a sum of the reception time $t_{11}$ of the first primary reception signal and the reception time $t_{12}$ of the second primary reception signal.

Therefore, even in a case where the ultrasonic wave is reflected on the plurality of surfaces of the target 30, in view of the relationship between the reception times as described above, it is possible to detect the reception signal corresponding to the multiple reception component (including the primary reflection component), that is, the reception signal based on the reflected wave reflected on the target 30. For example, a simultaneous equation is solved from the reception times of the reception signals. In this manner, the plurality of primary reception signals can be easily identified, and the reception time and the voltage value of the respective primary reception signals can be detected.

As illustrated in FIGS. 9 and 10, the reception signal other than the extracted reception signal is determined as the noise component reflected from those other than the target 30.

After Step S9, the multiple reflection detection unit 213 associates the reception time and the voltage value of the detected primary reception signal with the positional variable i, and stores the associated information in the storage unit 22.

The multiple reflection detection unit 213 determines whether or not the positional variable i is $I_{max}$(Step S10). In a case where it is determined as No, the process returns to Step S6. That is, the multiple reflection component is detected from the reception data of each positional variable i so as to detect the reception time and the voltage value of the primary reception signal.

If it is determined as Yes in Step S10, the position measurement unit 214 starts to measure the position.

Specifically, the position measurement unit 214 first initializes the positional variable i, and sets the positional variable i to 0 (Step S11). Thereafter, the position measurement unit 214 adds 1 to the positional variable i (step S12), and determines whether or not the positional variable i is 2 or more (Step S13).

In a case where it is determined as No in Step S13, the process returns to Step S12. If it is determined as Yes in Step S13, the position measurement unit 214 reads primary reception data (reception time and voltage value of the primary reception signal) of the positional variable i (first transmission/reception position). As comparison data, the position measurement unit 214 reads the primary reception data of a positional variable i−1 (comparison transmission/reception position; negative side comparison position) and a positional variable i+1 (comparison transmission/reception position; positive side comparison data) across the positional variable i (Step S14).

The position measurement unit 214 calculates an amplification factor of the primary reception signal of the positional variable i for the primary reception signal of the comparison data (Step S15), and selects the primary reception signal whose amplification factor is maximized (Step S16).

Figure 11:
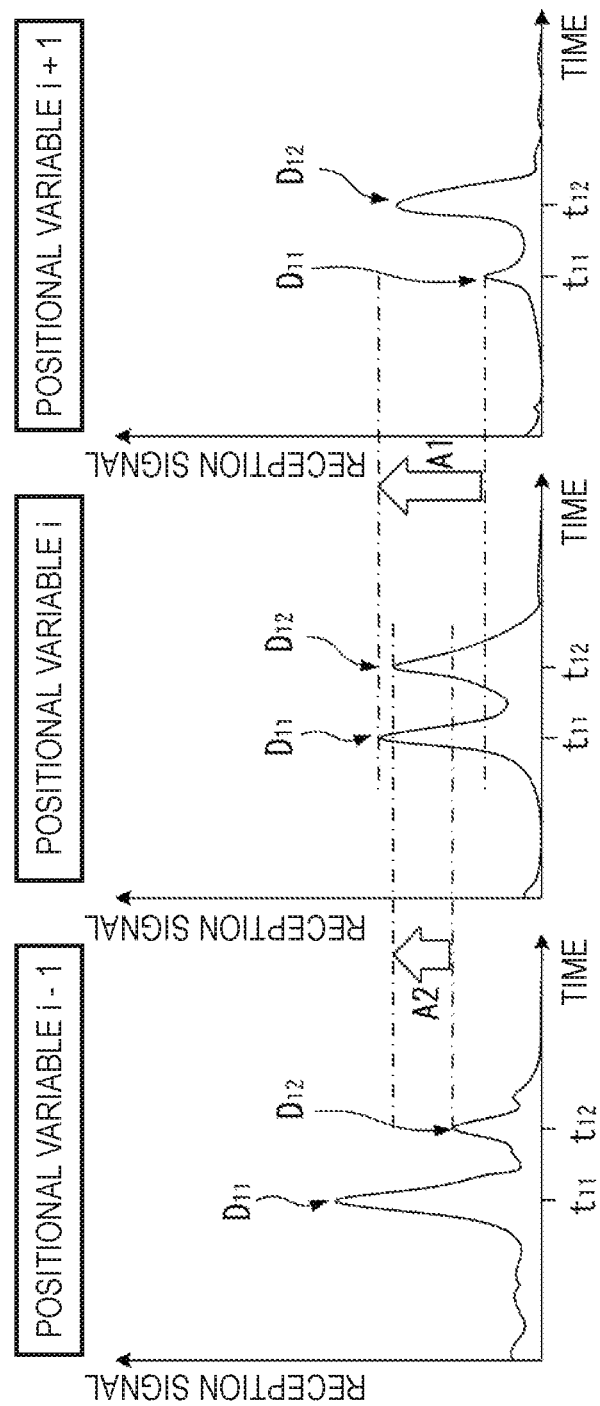
FIG. 11 is a view for describing a process in Step S15 to Step S16 in FIG. 7.

FIG. 11 is a view for describing a process in Step S15 to Step S16.

Here, the process in Step S15 and Step S16 will be described in detail by using the following case as an example. When a height position of the surface of the target 30 is scanned along the X-direction, as illustrated in FIG. 8, the first surface 30A is changed to the second surface 30B in the stepped portion 31 as a boundary.

In this example, the primary reception data corresponding to the positional variable i includes a primary reception signal $D_{11}$ corresponding to the first surface 30A and a primary reception signal $D_{12}$ corresponding to the second surface 30B. In addition, the voltage value of the first primary reception signal $D_{11}$ of the positional variable i increases as much as an amplification factor A1 compared to the voltage value of the first primary reception signal $D_{11}$ of the positional variable i+1. In addition, the voltage value of the second primary reception signal $D_{12}$ of the positional variable i increases as much as an amplification factor A2 compared to the voltage value of the second primary reception signal $D_{12}$ of the positional variable i−1.

In this case, the position measurement unit 214 calculates the amplification factor A1 and the amplification factor A2 as described above in Step S15. In step S16, the position measurement unit 214 compares the amplification factors A1 and A2 with each other, and selects one primary reception signal having the greater amplification factor, as the primary reception signal indicating the distance to the target 30 in the positional variable i. For example, in the example illustrated in FIG. 11, A1>A2 is satisfied. Accordingly, the position measurement unit 214 selects the first primary reception signal $D_{11}$ as the signal indicating the distance to the target 30.

Based on the primary reception signal selected in Step S16, the position measurement unit 214 calculates the distance between the ultrasonic transceiver 11 and the target 30 which corresponds to the positional variable i by using a time of flight (TOF) method (Step S17).

In order to calculate the distance in Step S17, sound speed in a medium (for example, air) between the ultrasonic transceiver 11 and the target 30 is set as c, and the reception time at which the primary reception signal is received is set as t. In this manner, a distance k is calculated using the following equation (1).

$$k(\text{mm}) = c(\text{mm/s}) \times t(\text{s}) \quad (1)$$

Here, an example has been described in which the distance is calculated based on the reception time t at which the peak position of the reception signal is detected. However, the invention is not limited thereto. For example, as described above, according to the present embodiment, the primary reception signal is identified by the multiple reflection detection unit 213 through the transmission/reception process of the ultrasonic wave. Therefore, the primary reception signals may be sampled at a predetermined sampling frequency fs as many as a sample number m. In this manner, the distance k may be calculated using the following equation (2).

$$k(\text{mm}) = c(\text{mm/s}) / (fs(\text{Hz}) \times m) \quad (2)$$

The position measurement unit 214 converts the calculated distance k to a coordinate of the target 30 corresponding to the positional variable i (Step S18). That is, the position (coordinate position in an XY-plane) of each ultrasonic transceiver 11 in the ultrasonic sensor 10 is known and stored in the storage unit 22. The position measurement unit 214 associates the distance k calculated in Step S17 with an XY-coordinate corresponding to the positional variable i. The position measurement unit 214 stores the associated information in the storage unit 22 as a three-dimensional coordinate indicating the surface of the target 30.

Thereafter, the position measurement unit 214 determines whether or not the positional variable i reaches the maximum value $I_{max}$ (Step S19). In a case where it is determined as No in Step S19, the process returns to Step S12.

In a case where it is determined as Yes in Step S19 and the distance k is calculated for all of the positional variables i, the position measurement unit 214 reads the three-dimensional coordinate of the target 30 corresponding to each positional variable i (each transmission/reception position) which is stored in the storage unit 22, and outputs the three-dimensional coordinate to a monitor, for example. For example, as an output format of the coordinates, each calculated three-dimensional coordinate may be displayed on the monitor, or the surface shape of the target 30 may be imaged and displayed, based on the three-dimensional coordinate.

Operation Effect According to Present Embodiment

The ultrasonic measurement device 1 according to the present embodiment includes the ultrasonic sensor 10 and the control unit 20. The ultrasonic sensor 10 has the ultrasonic transceiver 11 which transmits the ultrasonic wave, receives the reflected wave reflected on the target 30, and outputs the reception signal. The control unit 20 includes the scanning unit 212 which moves the transmission/reception position at which the ultrasonic transceiver 11 transmits and receives the ultrasonic wave, along the X-direction (first direction), and the position measurement unit 214 which measures the position of the target 30. When the plurality of primary reception signals are detected as the primary reception data for the positional variable i (first transmission/reception position) in the X-direction, as the comparison data, the position measurement unit 214 reads the primary reception data of the positional variable i−1 (comparison transmission/reception position) and the positional variable i+1 (comparison transmission/reception position) across the positional variable i. The position measurement unit 214 measures the position of the target 30, based on the ratio (amplification factor) between the voltage value (signal voltage) of each primary reception signal of each comparison data and the voltage value (signal voltage) of each primary reception signal of the positional variable i.

Even in a case where the stepped portion 31 is present in a portion of the target 30 along the X-direction, the primary reception signals reflected on the plurality of faces are respectively output at different reception timings. In this case, for example, if the distance is calculated regarding the reception signal received first time out of the plurality of reception signals as the primary reception signal corresponding to the primary reflection component of the multiple reflection component, there is a possibility of an error. In contrast, according to the present embodiment, the amplification factor of each primary reception signal is calculated using the comparison data. The primary reception signal whose amplification factor is maximized is selected so as to calculate the distance to the target 30. In this manner, it is possible to suppress the occurrence of the error as described above. Therefore, it is possible to very accurately perform the target position measurement and the target shape measurement with high resolution.

In the ultrasonic measurement device 1 according to the present embodiment, the position measurement unit 214 measures the position of the target 30, based on the reception signal corresponding to the primary reflection component reflected on the target 30.

This primary reception signal has the voltage value greater than the voltage value of the reception signal obtained using the ultrasonic wave having the multiple reflection component subsequent to the secondary reception signal received by the ultrasonic transceiver 11. Therefore, it is possible to accurately identify each peak position (reception time) of the plurality of primary reception signals. In addition, even when the amplification factor of each primary reception signal is calculated based on the comparison data, the amplification factor can be accurately calculated.

In the ultrasonic measurement device 1 according to the present embodiment, the position measurement unit 214 calculates the amplification factor of the first primary reception signal $D_{11}$ and the second primary reception signal $D_{12}$ of the positional variable i with respect to the first primary reception signal $D_{11}$ and the second primary reception signal $D_{12}$ of the positional variable i+1. In addition, the position measurement unit 214 calculates the amplification factor of the first primary reception signal $D_{11}$ and the second primary reception signal $D_{12}$ of the positional variable i with respect to the first primary reception signal $D_{11}$ and the second primary reception signal $D_{12}$ of the positional variable i−1. Thereafter, the position measurement unit 214 selects the primary reception signal whose amplification factor is maximized, and calculates the distance to the target 30.

In a case where the ultrasonic wave is transmitted from the ultrasonic transceiver 11 and the reflected wave is received, sound pressure of the ultrasonic wave reflected on the surface of the target in the direction perpendicular to the ultrasonic transceiver 11 is the highest. In a case where the first surface 30A and the second surface 30B face the ultrasonic transceiver 11, the sound pressure of the ultrasonic wave reflected on any one surface having a larger area of the surface facing the ultrasonic transceiver 11 out of the first surface 30A and the second surface 30B is higher than the sound pressure of the ultrasonic wave reflected on the other surface. Therefore, as in the present embodiment, the primary reception signal whose amplification factor increases for each primary reception signal of the comparison data is selected out of the respective primary reception signals in the positional variable i. In this manner, the distance can be very accurately calculated.

The ultrasonic measurement device 1 according to the present embodiment includes the multiple reflection detection unit 213 that detects the multiple reflection component corresponding to the plurality of reflection components, based on the result (reception data) of the transmission/reception process for the positional variable i. The position measurement unit 214 measures the position of the target 30, based on the reception signal corresponding to the ultrasonic wave having the multiple reflection component detected by the multiple reflection detection unit 213.

In this manner, even in a case where the reception component includes a lot of noise components, it is possible to easily distinguish between the noise component and the reception signal obtained by the ultrasonic wave reflected on the target 30, and it is possible to exclude the noise component. Therefore, the position measurement unit 214 can very accurately calculate the distance k to the target 30, based on the reception signal excluding the noise component.

In the ultrasonic measurement device 1 according to the present embodiment, the scanning unit 212 receives the reception signal corresponding to the primary reflection component and the reception signal corresponding to the secondary reflection component. Thereafter, the scanning unit 212 changes the positional variable i, and moves the transmission/reception position.

In this manner, the multiple reflection detection unit 213 can accurately detect the reception signal having the multiple reflection component.

Second Embodiment

In the above-described first embodiment, the ultrasonic sensor 10 has been described which has a one-dimensional array structure in which the ultrasonic transceivers 11 are arrayed in parallel along the X-direction. In contrast, a second embodiment is different from the above-described first embodiment in that the ultrasonic sensor has a two-dimensional array structure in which the ultrasonic transceivers 11 are arrayed in parallel. In the following description, the same reference numerals will be given to the previously described items, and description thereof will be omitted or simplified.

Figure 12:
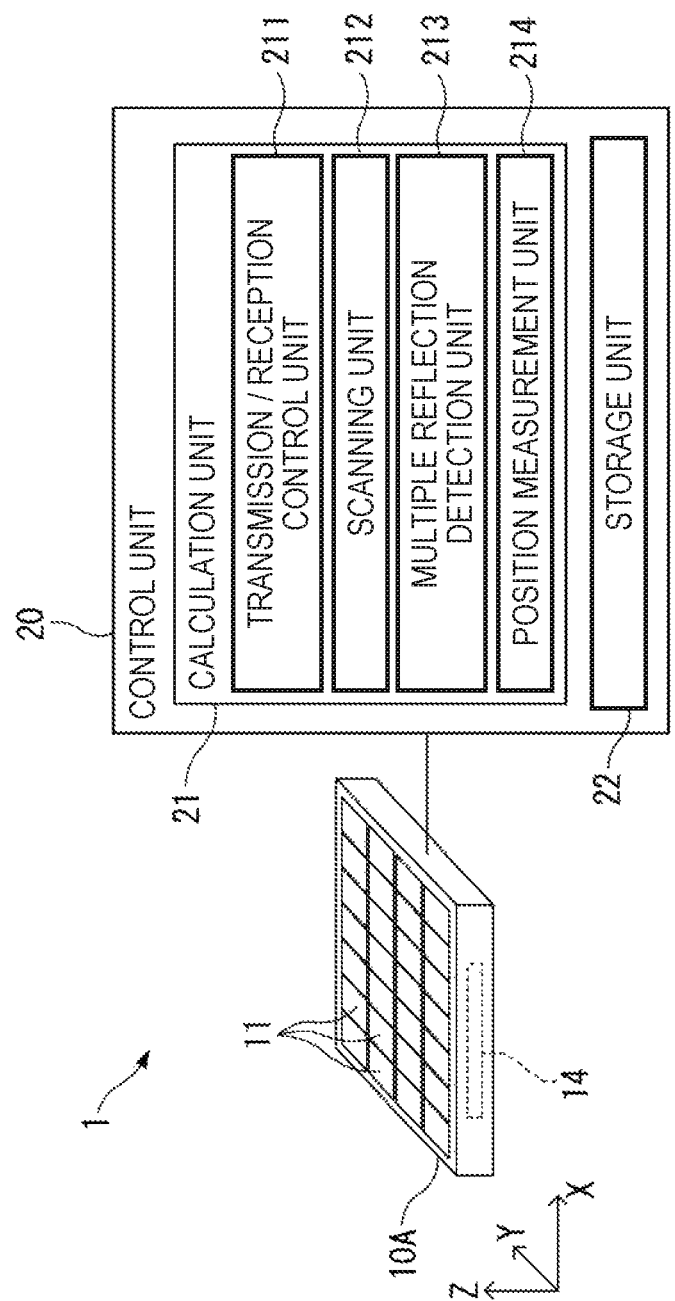
FIG. 12 is a view illustrating a schematic configuration of an ultrasonic measurement device according to a second embodiment.

FIG. 12 is a view illustrating a schematic configuration of the ultrasonic measurement device 1 according to the present embodiment.

As illustrated in FIG. 12, in the ultrasonic sensor 10A of the ultrasonic measurement device 1 of the present embodiment, the ultrasonic transceiver 11 is arranged along both the X-direction and the Y-direction. In such an ultrasonic sensor 10A, not only the position measurement for the X-direction of the target 30 but also the position measurement for the Y-direction can be implemented.

Figure 13:
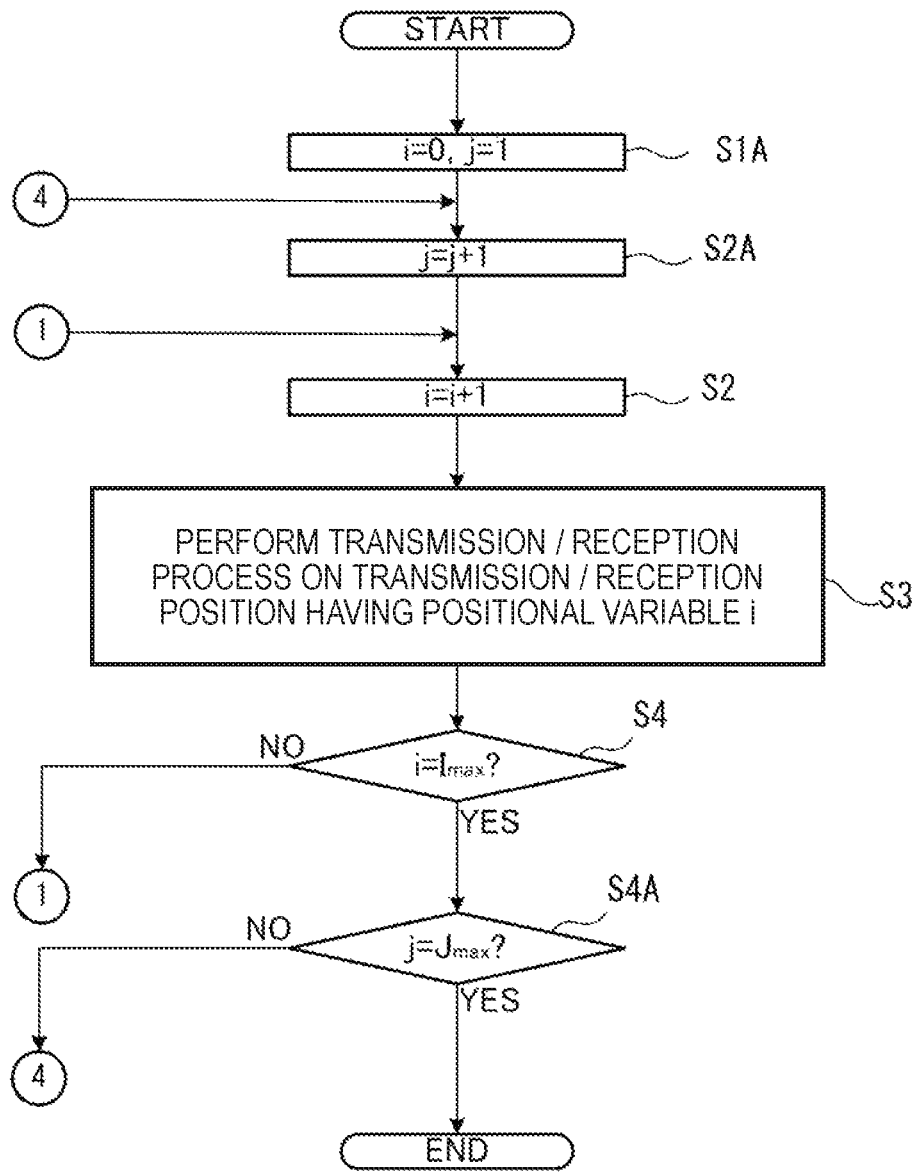
FIG. 13 is a flowchart illustrating a transmission/reception process of an ultrasonic wave in a measurement method of a position of a target, which is performed by the ultrasonic measurement device according to the second embodiment.
Figure 14:
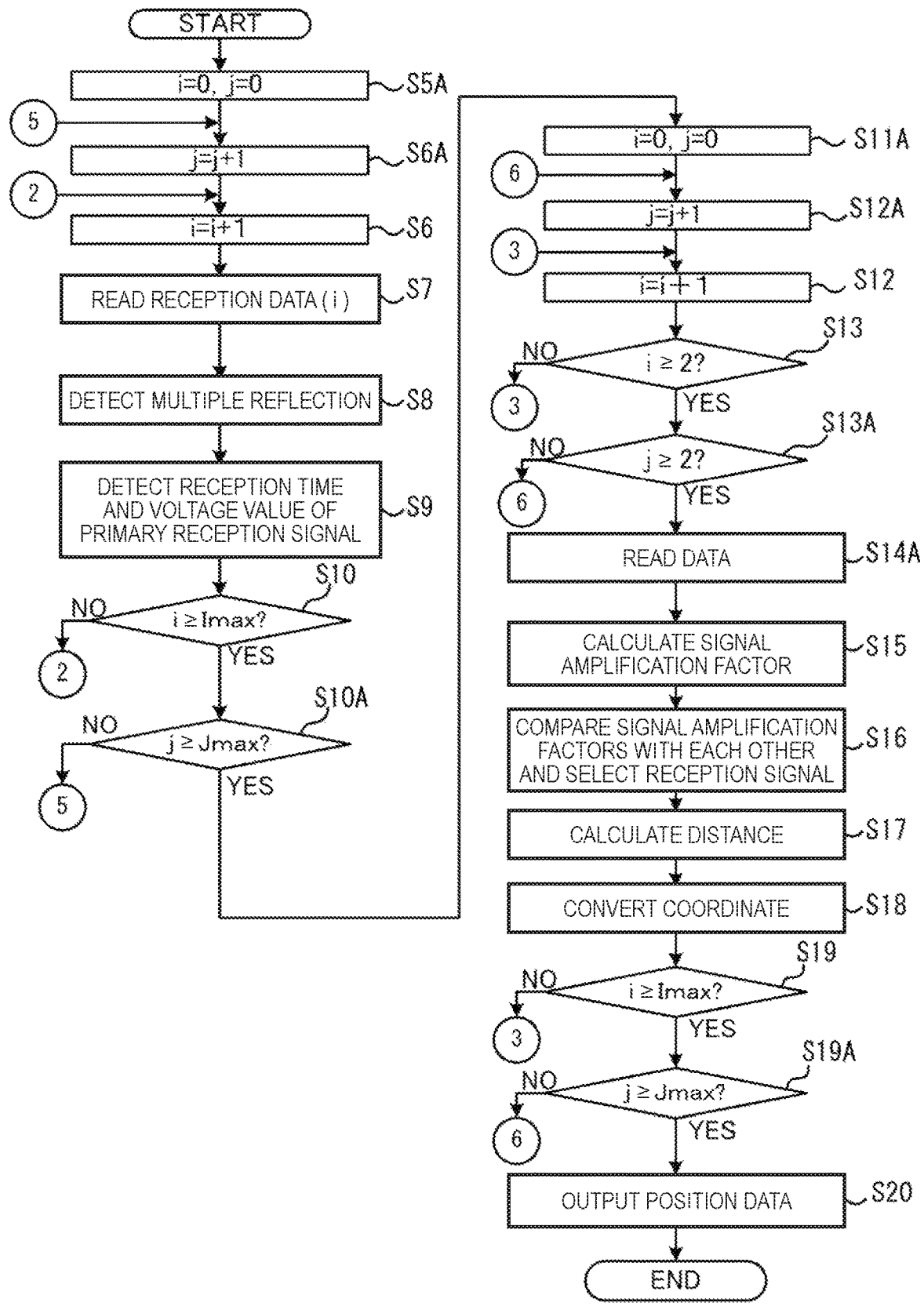
FIG. 14 is a flowchart illustrating a position measurement process in the measurement method of the position of the target, which is performed by the ultrasonic measurement device according to the second embodiment.

FIG. 13 is a flowchart illustrating a transmission/reception process of the ultrasonic wave in the measurement method of measuring the position of the target by using the ultrasonic measurement device 1 according to the present embodiment. FIG. 14 is a flowchart illustrating a position measurement process in the measurement method of measuring the position of the target by using the ultrasonic measurement device 1.

As illustrated in FIGS. 13 and 14, in the present embodiment, the position measurement process of the target 30 can be performed using a process substantially the same as that according to the first embodiment.

Here, in the present embodiment, instead of the process in Step S1 according to the first embodiment, the control unit 20 initializes the positional variable i indicating the transmission/reception position in the X-direction and a positional variable j indicating the transmission/reception position in the Y-direction (i=0, j=0) (Step S1A). After Step S1A and before Step S2, the scanning unit 212 adds 1 to the positional variable j (Step S2A), and then, performs the process in Step S2. Through the process in Step S3, the control unit 20 performs the transmission/reception process of the ultrasonic wave by using the ultrasonic transceiver 11 corresponding to the positional variables i and j. Thereafter, in a case where it is determined as Yes in Step S4, the scanning unit 212 determines whether or not the positional variable j reaches a maximum value $J_{max}$(Step S4A). In a case where it is determined as No in Step S4A, the process returns to Step S2A. In this manner, in the present embodiment, the respective ultrasonic transceivers 11 arranged in the two-dimensional array structure in the X-direction and the Y-direction perform the transmission/reception process of the ultrasonic wave, thereby acquiring the reception data for each transmission/reception position.

In the present embodiment, instead of the process in Step S5 according to the first embodiment, the control unit 20 initializes both the positional variable i indicating the transmission/reception position in the X-direction and the positional variable j indicating the transmission/reception position in the Y-direction (i=0, j=0) (step S5A). After Step S5A and before Step S6, the multiple reflection detection unit 213 adds 1 to the positional variable j (Step S6A), and then, performs the process in Step S6. Through the processes in Step S7 to Step S9, the multiple reflection detection unit 213 extracts the primary reception data from the reception data at the transmission/reception position corresponding to the positional variables (I, j). Thereafter, in a case where it is determined as Yes in Step S10, the multiple reflection detection unit 213 determines whether or not the positional variable j reaches the maximum value $J_{max}$ (Step S10A). In a case where it is determined as No in Step S10A, the process returns to Step S6A. In this manner, according to the present embodiment, it is possible to obtain the primary reception data corresponding to the respective transmission/reception positions arranged in the two-dimensional array structure in the X-direction and the Y-direction.

Furthermore, in the present embodiment, instead of the process in Step S11 according to the first embodiment, the control unit 20 initializes both the positional variable i indicating the transmission/reception position in the X-direction and the positional variable j indicating the transmission/reception position in the Y-direction (i=0, j=0) (Step S11A). After Step S11A and before Step S12, the position measurement unit 214 adds 1 to the positional variable j (Step S12A), and then, performs the process in Step S12.

When it is determined as Yes in Step S13, the position measurement unit 214 further determines whether or not the positional variable j is equal to or more than 2 (Step S13A). If it is determined as No in Step S13A, the process returns to Step S12A.

On the other hand, if it is determined as Yes in Step S13A, the process in Step S14A is performed instead of Step S14. In step S14A, in addition to the primary reception data of the transmission/reception position (first transmission/reception position) indicated by the positional variables (i, j), the primary reception data of the transmission/reception position (first comparison transmission/reception position) of the positional variables (i−1, j), (i+1, j) and the primary reception data of the transmission/reception position (second comparison transmission/reception position) of the positional variables (i, j−1), (i, j+1) are read as the comparison data.

In Step S15, the amplification factor of each primary reception signal at the first transmission/reception position is calculated for each comparison data. In Step S16, the primary reception signal whose amplification factor is maximized is selected. Thereafter, through the processes in Step S17 and Step S18, the distance k between the ultrasonic transceiver 11 corresponding to the positional variables (i, j) and the target 30 is calculated, and is converted into the three-dimensional coordinate of the target 30.

Thereafter, in a case where it is determined as Yes after the process in Step S19 is performed, the position measurement unit 214 determines whether or not the positional variable j reaches the maximum value $J_{max}$ (step S19A). In a case where it is determined as No in Step S19A, the process returns to Step S12A. In a case where it is determined as Yes in Step S19A, the process in Step S20 is performed similarly to the first embodiment.

In the ultrasonic measurement device 1 according to the present embodiment as described above, the distance is calculated, based on the reception data at the respective transmission/reception positions along the X-direction and the Y-direction. In this manner, the shape of the target 30 can be more accurately measured with higher resolution.

Modification Example

In the first embodiment, the scanning unit 212 switches the ultrasonic transceiver 11 which performs the transmission/reception process of the ultrasonic wave, out of the plurality of ultrasonic transceivers 11. In this manner, transmission/reception process of the ultrasonic wave is performed on the plurality of positions. In contrast, a single or the plurality of ultrasonic transceivers 11 may be held by a holding member movable in the X-direction. For example, a drive mechanism for moving the holding member by using a drive force of a drive source such as a motor may be provided. In this case, the scanning unit 212 controls the drive mechanism so as to move the ultrasonic transceiver 11 in the X-direction. In this manner, the transmission/reception positions of the ultrasonic wave can be scanned along the X-direction.

The second embodiment may employ the similar configuration. The ultrasonic transceiver 11 may be held by the holding member movable in the X-direction and the Y-direction, and the holding member may be moved by the drive mechanism which moves the holding member in the XY-directions.

In the first embodiment, in a case where the positional variable i is 1, there is no comparison data corresponding to the positional variable i−1 which indicates the negative side comparison position. In a case where the positional variable i is $I_{max}$, there is no comparison data corresponding to the positional variable i+1 which indicates the positive side comparison position. In this case, the position measurement unit 214 may calculate the distance k by using only one comparison data. For example, in a case where A1>A2 is satisfied after the voltage value of the first primary reception signal $D_{11}$ of the positional variable $I_{max}$ is amplified by the amplification factor A1 compared to a positional variable $I_{max}$−1 and the voltage value of the second primary reception signal $D_{12}$ of positional variable $I_{max}$ is amplified by the amplification factor A2 compared to the positional variable $I_{max}-1$, the position measurement unit 214 selects the first primary reception signal $D_{11}$ so as to calculate the distance k.

In the second embodiment, an example has been described in which the process in Step S14A is performed in a case where it is determined as Yes in Step S13 and Step S13A. However, the invention is not limited thereto.

Even in a case where it is determined as No in Step S13A, in a case where the positional variable i is 2 or more, the process in Step S14 may be performed similarly to the first embodiment. That is, only the primary reception data in the X-direction may be used so as to obtain the three-dimensional coordinate of the target 30 corresponding to each transmission/reception position in a column of j32 1. Similarly, with regard to a column of $j=J_{max}$, only the primary reception data in the X-direction may be used so as to obtain the three-dimensional coordinate of the target 30.

The same configuration is applicable to a case where the positional variable i is 1. In a case where the positional variable j is 2 or more, only the primary reception data in the Y-direction may be used so as to obtain the three-dimensional coordinate of the target corresponding to each transmission/reception position in a column of i=1. Similarly, with regard to a column of $i=I_{max}$, only the primary reception data in the Y-direction may be used so as to obtain the three-dimensional coordinate of the target 30.

In the above-described first and second embodiments, the primary reception data is extracted by the multiple reflection detection unit 213, and the position measurement unit 214 calculates the distance k, based on the extracted primary reception data. However, the invention is not limited thereto. For example, if the voltage value of the secondary reception data is sufficiently great when the secondary reflected wave is received, the distance may be calculated, based on the secondary reception data.

In the above-described first and second embodiments, the primary reception signal used for calculating the distance k is selected using the amplification factor from each primary reception signal of the comparison data to each primary reception signal at the first transmission/reception position. However, the invention is not limited thereto. For example, an attenuation factor of the voltage value from each primary reception signal of the comparison data to each primary reception signal at the first transmission/reception position may be calculated so as to select the primary reception signal whose attenuation factor is minimized.

In the above-described first and second embodiments, an example has been described in which the calculation unit 21 of the control unit 20 functions as the multiple reflection detection unit 213. However, the invention is not limited thereto. For example, in a case where the approximate distance from the ultrasonic sensors 10 and 10A to the target 30 is known, an approximate time (measurement time) from the transmission timing of the ultrasonic wave until the secondary reflected wave is received may be set so as to acquire the reception signal received within the measurement time, as the primary reception signal. In this case, for example, noise may be eliminated from the reception signal by using a low-pass filter so as to identify the plurality of reception signals whose voltage value is equal to or greater than a predetermined value, as the plurality of primary reception signals.

In the above-described first and second embodiments, an example has been described in which during the scanning, the transmission/reception positions are sequentially moved along the X-direction. However, the invention is not limited thereto. The order of performing the transmission/reception process of the ultrasonic wave on the respective transmission/reception position along the X-direction is not particularly limited. For example, the transmission/reception process may be performed in the odd number order of the transmission/reception positions (i=1, 3, 5 . . . 2n+1 . . . ) arrayed in parallel in the X-direction. Thereafter, the transmission/reception process may be performed in the even number order of the transmission/reception positions (i=2, 4, 6 . . . 2n . . . ). In this case, the influence of crosstalk can be reduced.

The same configuration is applicable to the scanning in the Y-direction according to the second embodiment.

Alternatively, a specific structure for an actual use according to the invention may be configured so that above-described embodiments and modification examples are appropriately combined with each other within the scope which can achieve the gist of the invention. The structures according to the invention may be appropriately modified to other structures.

The entire disclosure of Japanese Patent Application No. 2017-250708 filed Dec. 27, 2017 is expressly incorporated herein by reference.

What is claimed is:

1. An ultrasonic measurement device comprising:
an ultrasonic transceiver that transmits an ultrasonic wave and receives a reflected wave reflected on a target so as to output a reception signal;
a scanning unit that moves a transmission/reception position where the ultrasonic transceiver transmits and receives the ultrasonic wave, along a first direction; and
a position measurement unit that measures a position of the target,
wherein when a plurality of the reception signals corresponding to a plurality of reflection components caused by a difference in distances from the target are detected at a first transmission/reception position in the first direction, the position measurement unit selects the reception signal, based on a ratio between a voltage value of the plurality of reception signals at a comparison transmission/reception position different from the first transmission/reception position and a voltage value of the plurality of reception signals at the first transmission/reception position, and the position measurement unit measures the position of the target, based on the selected reception signal.

2. The ultrasonic measurement device according to claim 1,
wherein the position measurement unit measures the position of the target, based on the reception signal corresponding to a primary reflection component reflected from the target.

3. The ultrasonic measurement device according to claim 1,
wherein the comparison transmission/reception position includes a negative side comparison position closer to a negative side in the first direction than the first transmission/reception position and a positive side comparison position closer to a positive side in the first direction than the first transmission/reception position.

4. The ultrasonic measurement device according to claim 1, further comprising:
a multiple reflection detection unit that detects the reception signal corresponding to the ultrasonic wave reflected multiple times between the target and the ultrasonic transceiver at the first transmission/reception position, wherein the position measurement unit measures the position of the target, based on the reception signal corresponding to the ultrasonic wave reflected multiple times which is detected by the multiple reflection detection unit.

5. The ultrasonic measurement device according to claim 4,
wherein the scanning unit moves the transmission/reception position after receiving the reception signal corresponding to a primary reflection component and the reception signal corresponding to a secondary reflection component.

6. The ultrasonic measurement device according to claim 1,
wherein the scanning unit further moves the transmission/reception position along a second direction intersecting the first direction, and
wherein the position measurement unit selects the reception signal, based on a ratio of voltage values of the plurality of reception signals between a first comparison transmission/reception position different from the first transmission/reception position in the first direction and the first transmission/reception position, and a ratio of voltage values of the plurality of reception signals between a second comparison transmission/reception position different from the first transmission/reception position in the second direction and the first transmission/reception position.

7. A measurement method of a position of a target in an ultrasonic measurement device having an ultrasonic transceiver that transmits an ultrasonic wave and receives a reflected wave reflected on the target so as to output a reception signal, the method comprising:
moving a transmission/reception position where the ultrasonic transceiver transmits and receives the ultrasonic wave, along a first direction; and
measuring the position of the target, based on the reception signal received at the transmission/reception position,
wherein in measuring the position of the target, when a plurality of the reception signals corresponding to a plurality of reflection components caused by a difference in distances from the target are detected at a first transmission/reception position in the first direction, the position measurement unit selects the reception signal, based on a ratio between a voltage value of the plurality of reception signals at a comparison transmission/reception position different from the first transmission/reception position and a voltage value of the plurality of reception signals at the first transmission/reception position, and the position measurement unit measures the position of the target, based on the selected reception signal.

\* \* \* \* \*